(12) United States Patent
Wu et al.

(10) Patent No.: US 6,826,834 B2
(45) Date of Patent: Dec. 7, 2004

(54) MANUFACTURING METHOD OF A MUFFLER ASSEMBLY

(76) Inventors: I-Long Wu, 6F-1, No. 30, Lin Sen Rd., Shi Chiu, Taichung (TW); Chia-Tien Wu, 6F-1, No. 30, Lin Sen Rd., Shi Chiu, Taichung (TW)

( * ) Notice: Subject to any disclaimer, the term of this patent is extended or adjusted under 35 U.S.C. 154(b) by 0 days.

(21) Appl. No.: 10/369,702

(22) Filed: Feb. 21, 2003

(65) Prior Publication Data

US 2004/0163253 A1 Aug. 26, 2004

(51) Int. Cl.[7] ............................................. B23P 15/20
(52) U.S. Cl. ........................ 29/890.08; 29/428; 29/505
(58) Field of Search ............................. 29/840.08, 428, 29/505; 181/212, 222, 227, 228, 249, 255

(56) References Cited

U.S. PATENT DOCUMENTS

| | | | | |
|---|---|---|---|---|
| 2,538,450 A | * | 1/1951 | Gardner | 96/350 |
| 3,523,590 A | * | 8/1970 | Straw | 181/282 |
| 4,342,272 A | * | 8/1982 | Transue et al. | 112/237 |
| 5,173,576 A | * | 12/1992 | Feuling | 181/247 |
| 5,572,868 A | * | 11/1996 | Okamoto et al. | 60/323 |
| 5,642,640 A | * | 7/1997 | Insalaco et al. | 72/334 |
| 5,862,662 A | * | 1/1999 | Fukuda et al. | 60/313 |
| 5,970,939 A | * | 10/1999 | Motosugi et al. | 123/184.21 |
| 6,026,570 A | * | 2/2000 | Bohm et al. | 29/890.08 |
| 2002/0116819 A1 | * | 8/2002 | Smatloch et al. | 29/890.08 |

* cited by examiner

*Primary Examiner*—Irene Cuda Rosenbaum
(74) *Attorney, Agent, or Firm*—Rosenberg, Klein & Lee

(57) ABSTRACT

A method of manufacturing a muffler assembly is provided that includes the step of cutting a pipe to a length that is slightly longer than that of a muffling device. The method includes the step of forging a lower end of the pipe to form an exhaust pipe. Then, the muffling device is spirally wound and inserted in a middle portion of the pipe. An upper end of the pipe is then forged and formed as an inlet pipe. The method also includes the step of forging the inlet pipe and the exhaust pipe again to hold the muffling device in place in the middle portion of the pipe.

11 Claims, 12 Drawing Sheets

MANUFACTURING METHOD OF A MUFFLER ASSEMBLY

BACKGROUND OF THE INVENTION

1. Field of the Invention

The present invention relates to a manufacturing method, and more particularly to a manufacturing method of a muffler assembly.

2. Description of Related Art

Conventional muffler assemblies are usually classified in one of the following types:

A. straight pipe type in which there are many muffler elements adhered on an inner periphery of the pipe;

B. tortuous pipe type using a tortuous pipe to increase the muffler area for providing the muffler effect;

C. swell type having a structure similar to that of the straight type, but with an enlarged portion to dissipate energy; and D. resonance type in which there is a resonance chamber directed to certain acoustic frequencies to achieve the muffling objective.

A conventional muffler assembly comprises a casing having two holes defined in opposite ends of the casing. A corresponding one of the above muffler types is received in the casing via the two holes in the casing. An inlet pipe and an exhaust pipe are respectively inserted into a respective one of the two holes in the casing. The inlet pipe and the exhaust pipe are secured to the casing by welding. Most of the manufacturing processes of a conventional muffler assembly are welded such that the manufacturing processes are complicated, the work environment is bad and the manufacturing cost is difficult to reduce.

The present invention has been developed to mitigate and/or obviate the disadvantages of the conventional manufacturing method of a muffler assembly.

SUMMARY OF THE INVENTION

The main objective of the present invention is to provide an improved method for manufacturing a muffler assembly.

To achieve the objective, the manufacturing method in accordance with the invention comprises the following steps:

Step 1. a pipe is cut to a length slightly longer than that of a muffling device;

Step 2. the pipe has a lower end that is forged and formed as an exhaust pipe;

Step 3. a muffling device that is wound as a spiral is inserted in a middle portion of the pipe;

Step 4. the pipe has an upper end that is forged and formed as an inlet pipe; and Step 5. the inlet pipe and the exhaust pipe are forged again to hold the muffling device in place in the middle portion of the pipe.

Further benefits and advantages of the present invention will become apparent after a careful reading of the detailed description with appropriate reference to the accompanying drawings.

DETAILED DESCRIPTION ON THE INVENTION

Figure 1B:
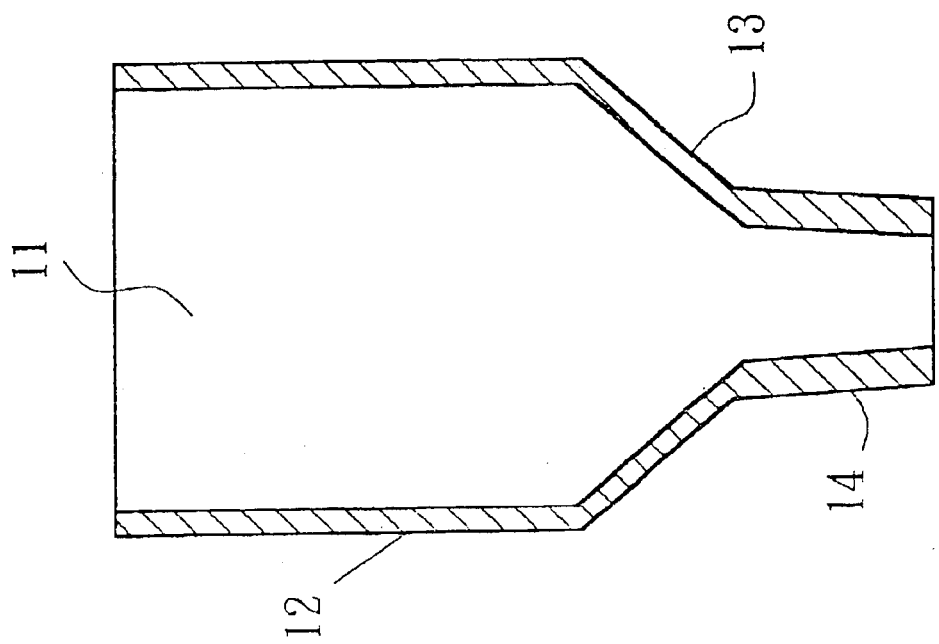
FIG. 1B is a cross sectional view of the cylinder in FIG. 1A and forged to form an exhaust pipe.
Figure 1A:
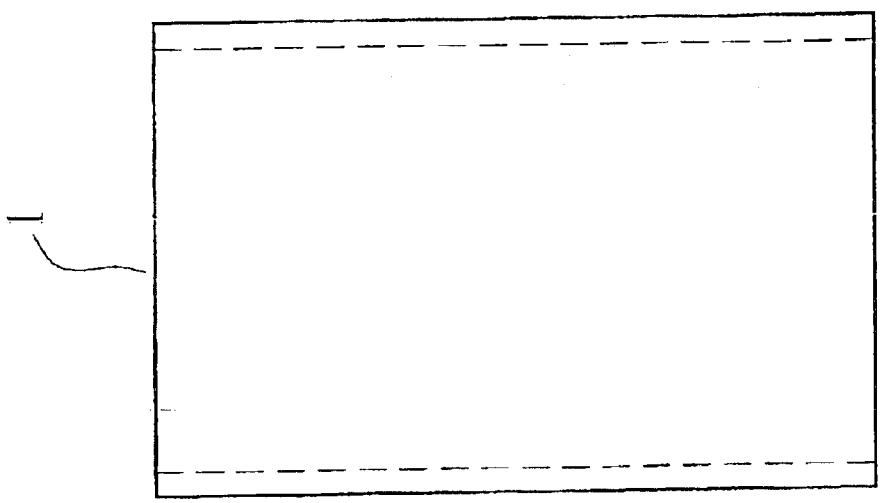
FIG. 1A is a plan view of a cylinder of a first embodiment of a muffler assembly that is made of a manufacturing method in accordance with the present invention before being manufactured.
Figure 1C:
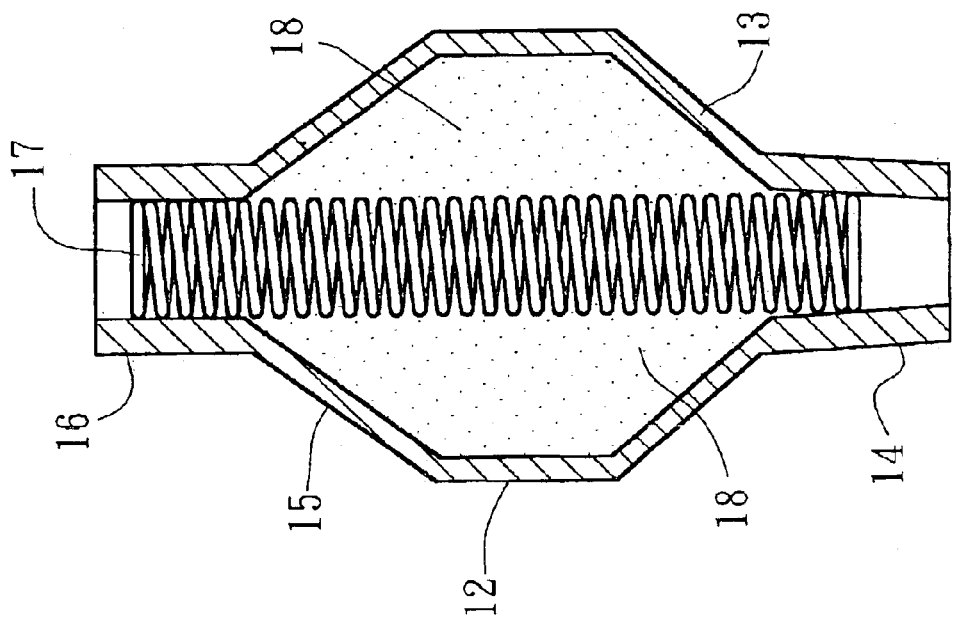
FIG. 1C is a cross sectional view of the first embodiment of the muffler assembly with a muffling device and muffling material received in the cylinder in FIG. 1B.
Figure 1D:
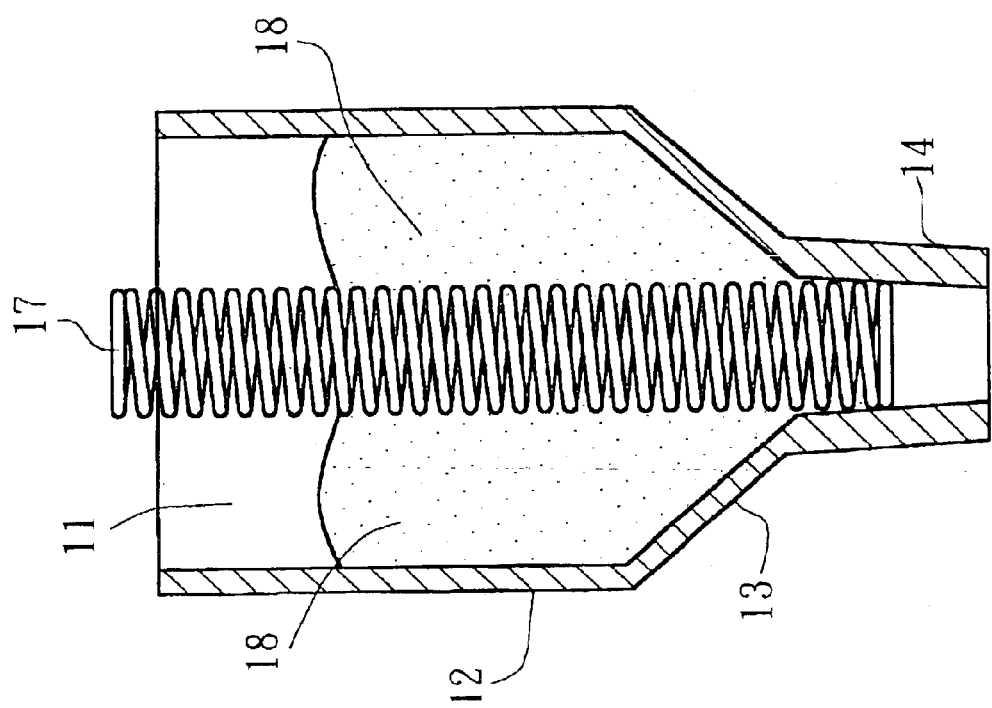
FIG. 1D is a cross sectional view of the first embodiment of the muffler assembly where the cylinder in FIG. 1C is forged to form an inlet pipe.
Figure 1E:
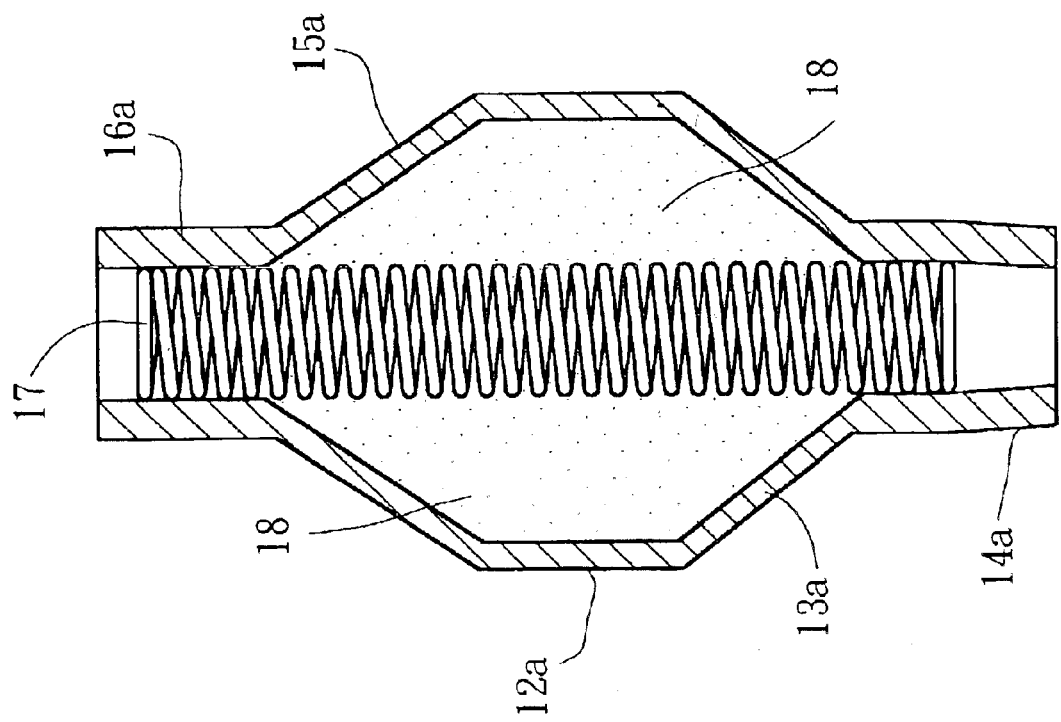
FIG. 1E is a cross sectional view showing the cylinder in FIG. 1D is forged again to hold the muffling device in place in the cylinder.

A method of manufacturing a muffler assembly in accordance with the present invention comprises the following steps:

Step 1. a cylinder is cut to have a length slightly longer than that of a muffling device;

Step 2. the cylinder has a lower end that is forged to form an exhaust pipe;

Step 3. the muffling device is spirally wound and inserted into a middle portion of the cylinder via an upper end of the cylinder;

Step 4. the cylinder has an upper end that is forged to form an inlet pipe and the muffling device has two opposite ends respectively received in the exhaust pipe and the inlet pipe; and Step 5. the inlet pipe and the exhaust pipe are forged again to hold the muffling device in place in the middle portion of the cylinder.

The spirally wound muffling device can increase the reflective surfaces at various angles and increase the muffling effect. The outer periphery of the muffling device is manufactured with a rough surface or has multiple muffling materials adhered on the outer periphery of the muffling device, when the muffling device is made of a wire material. There are multiple holes with different sizes formed in the muffling device to increase the muffling effect when the muffling device is made of a pipe material, a plate material or a U-shaped material.

The manufacturing processes of the muffling device are divided into the following types.

1. Straight Pipe Type: the muffling device is spirally manufactured and a gap is formed between every two adjacent spirals. The muffling device has a length shorter than a distance between the inlet pipe and the exhaust pipe, and a diameter smaller that that of the inlet and the exhaust pipe. There are many muffling materials adhered on an outer periphery of the muffling device.

2. Tortuous Pipe Type: the muffling device is spirally manufactured and has a length longer than a distance between the inlet pipe and the exhaust pipe, such that the muffling device forms several curves in the muffling assembly. There is no muffling material adhered on the outer periphery of the muffling device when the two adjacent spirals of the muffling device abut each other and there are multiple muffling materials adhered on the outer periphery of the muffling device when a gap is formed between the two adjacent spirals.

3. Swell Type: The muffling device is spirally manufactured and a gap is formed between every two adjacent spirals. The muffling device has two opposite ends, each end having a diameter smaller than that of the inlet pipe and the exhaust pipe. The muffling device has at least one portion formed to correspond to the middle portion of the muffling assembly.

4. Resonance Type: the pipe is forged to form multiple resonance chambers for muffling acoustic frequencies, and the above described muffling devices can be mounted in a resonance chamber for promoting the muffling effect.

The above types of muffling devices can be selectively serially connected for promoting the muffling effect.

With reference to FIGS. 1A–1E, a first embodiment of a muffling assembly that is manufactured by the method of the present invention is shown. The manufacturing method of the present invention for manufacturing the first embodiment comprises the following steps.

Step 1: a cylinder (1) is cut to have a length slightly longer than that of the muffling device.

Step 2: the cylinder (1) has a first end (11), a second end opposite to the first end of the cylinder and a middle portion (12) formed between the first end and the second end of the cylinder (1). The second end of the cylinder (1) is forged to form a tapering portion (13) and an exhaust pipe (14).

Step 3: a corresponding one of the above muffling devices is longitudinally inserted into the cylinder (1) and muffling material (18) is received between the muffling device (17) and an inner periphery of the cylinder (1) via the first end of the cylinder (1). The muffling device (17) has a first end received in the exhaust pipe (14).

Step 4. the first end of the cylinder (1) is forged to form a tapering portion (15) and an inlet pipe (16). The muffling device (17) has a second end received in the inlet pipe (16).

Step 5. the first end and the second end of the cylinder (1) are forged again and the diameters of the first end and the second end of the cylinder are reduced to clamp the first end and the second end of the muffling device (17) for holding the muffling device (17) in place in the cylinder (1).

Noise passes into the inlet pipe (16), past the muffling device (17) and the muffling material (18), and out the exhaust pipe (14), and is partially eliminated.

Figure 2:
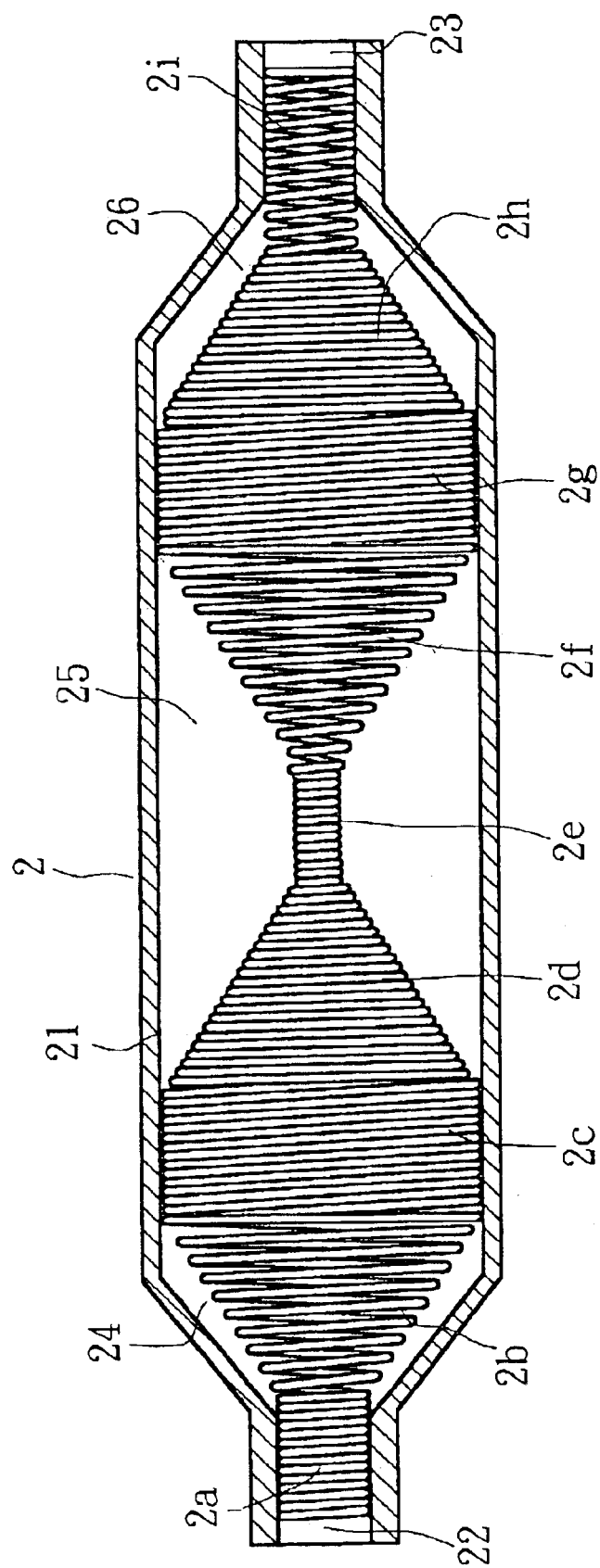
FIG. 2 is a cross sectional view of a second embodiment of a muffler assembly that is made by a manufacturing method in accordance with the present invention.

With reference to FIG. 2, it shows a second embodiment of the muffler assembly that is manufactured by the method of the present invention. The muffler assembly (2) comprises a cylinder (21) and a muffling device (not numbered) longitudinally received in the cylinder (21). The manufacturing method of the cylinder (21) of the second embodiment is the same as that of the above first embodiment. The cylinder (21) has an inlet pipe (22), a first swell chamber (24), a second swell chamber (25), a resonance chamber (26) and an exhaust pipe (23). The muffling device is spirally manufactured and longitudinally received in the cylinder (21). The muffling device has a first end (2a) securely received in the inlet pipe (22). The spirals of the first end (2a) of the muffling device abut one another. A first section (2b) integrally extends from the first end (2a) of the muffling device and is received in the first swell chamber (24). The spirals of the first section (2b) are separated from one another. The first section (2b) has a diameter that is gradually increased relative to the exhaust pipe (23). A second section (2c) integrally extends from the first section (2b) of the muffling device. The spirals of the second section (2c) abut one another and abut an inner periphery of the cylinder (21) to separate the first swell chamber (24) from the second swell chamber (25). A third section (2d) integrally extends from the second section (2c) of the muffling device and is received in the second swell chamber (25). The third section (2d) has a diameter that is gradually reduced relative to the exhaust pipe (32) and the spirals of the third section (2d) abut one another. A fourth section (2e) integrally extends from the third section (2d) of the muffling device and is received in the second swell chamber (25). The spirals of the fourth section (2e) of the muffling device abut one another. A fifth section (2f) integrally extends from the fourth section (2e) and is received in the second swell chamber (25). The fifth section (2f) of the muffling device has a structure that is the same as that of the first section (2b) of the muffling device. A sixth section (2g) integrally extends from the fifth section (2f) of the muffling device. The sixth section (2g) has a structure that is the same as the second section (2c) of the muffling device and separates the second swell chamber (25) from the resonance chamber (26). A seventh section (2h) integrally extends from the sixth section (2g) and is received in the resonance chamber (26). The seventh section (2h) of the muffling device has a structure that is the same as that of the third section (2d) of the muffling device. The muffling device has a second end (2i) integrally extending from the seventh section (2h) thereof and securely received in the exhaust pipe (23) of the cylinder (21). The spirals of the second end (2i) of the muffling device are separated from one another.

Sound waves expand and are partially eliminated in the second section (2c) of the muffling device and the first swell chamber (24) after passing through the inlet pipe (22), the first end (2a) and the first section (2b) of the muffling device. The sound waves are compressed and partially eliminated in the third section (2d) and the fourth section (2e) of the muffling device. The sound waves expand and are partially eliminated in the fifth section (2f) of the muffling device and the second swell chamber (25). The sound waves are compressed and partially eliminated in the sixth section (2g) and the seventh section (2h). The sound waves resonate and are partially eliminated in the resonance chamber (26). Finally, the residual sound waves pass through the second end and the exhaust pipe (23) of the cylinder (21).

Figure 3:
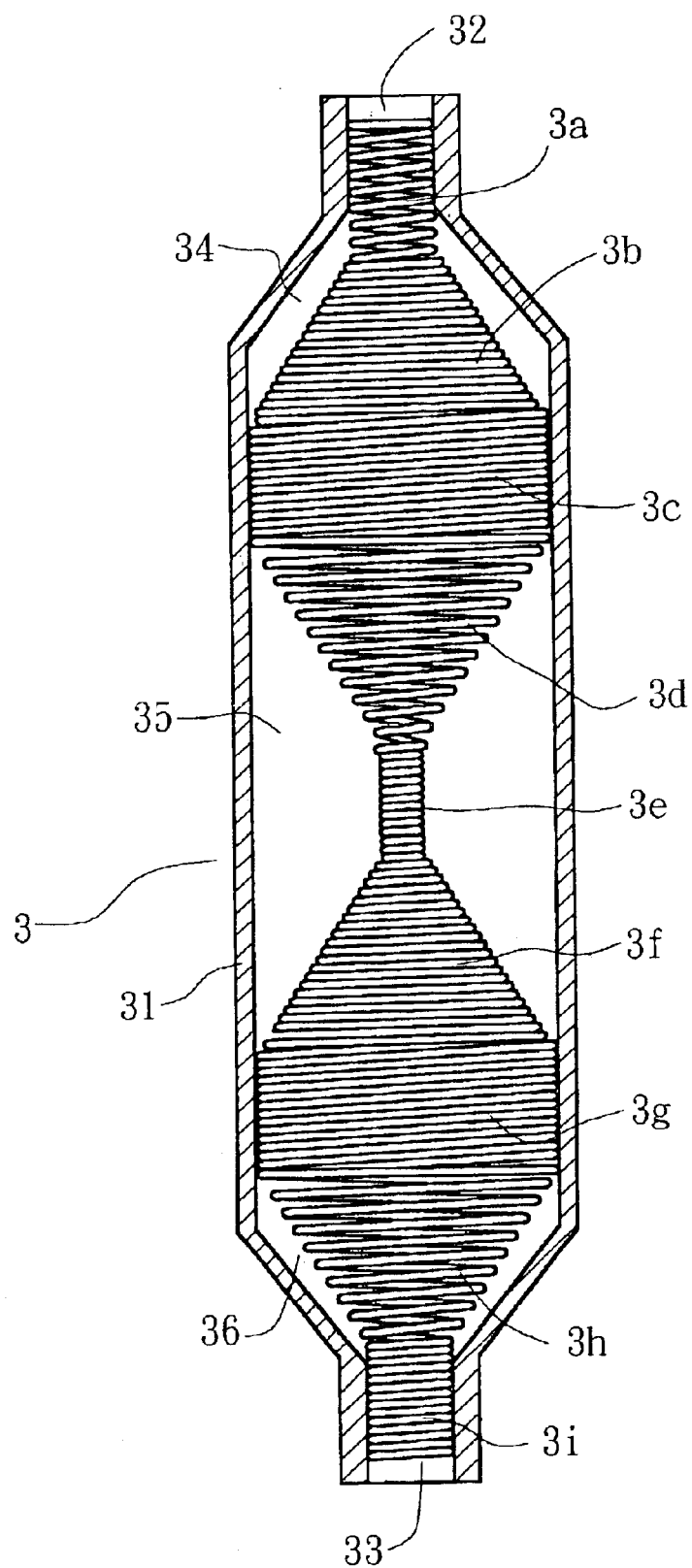
FIG. 3 is a cross sectional view of a third embodiment of a muffler assembly that is made by a manufacturing method in accordance with the present invention.

FIG. 3 shows a third embodiment of the muffler assembly manufactured by the method of the present invention. The third embodiment of the present invention has a structure that is different from the second embodiment of the present invention. The muffler assembly (3) of the third embodiment comprises a cylinder (31) and a muffling device longitudinally received in the cylinder (31). The cylinder (31) has an inlet pipe (32), a resonance chamber (34), a first swell chamber (35), a second swell chamber (36) and an exhaust pipe (33). The muffling device has a first end (2a) secured in the inlet pipe (32) of the cylinder (31), a first section (2b), a second section (3c), a third section (3e), a fifth section (3f), a sixth section (3g), a seventh section (3h) and a second end (3i) secured in the exhaust pipe (33) of the cylinder (31).

Sound waves resonate and are partially eliminated in the resonance chamber (34) after passing through tie inlet pipe (32) and the first end (3a) of the muffling device. The sound waves expand and are partially eliminated in the first swell chamber (35) after passing through the first section (3b), the second section (3c) and the third section (3d) of the muffling device. The sound waves are compressed and partially eliminated when passing through the fourth section (3e) of the muffling device. The sound waves expand and are partially eliminated in the second chamber (36) after passing through the fifth section (3f), the sixth section (3g) and the seventh section (3h) of the muffling device. The sound waves are compressed and partially eliminated when passing through the second end (3i) of the muffling device. The residual sound waves are exhausted via the exhaust pipe (33) of the cylinder (31).

Figure 4:
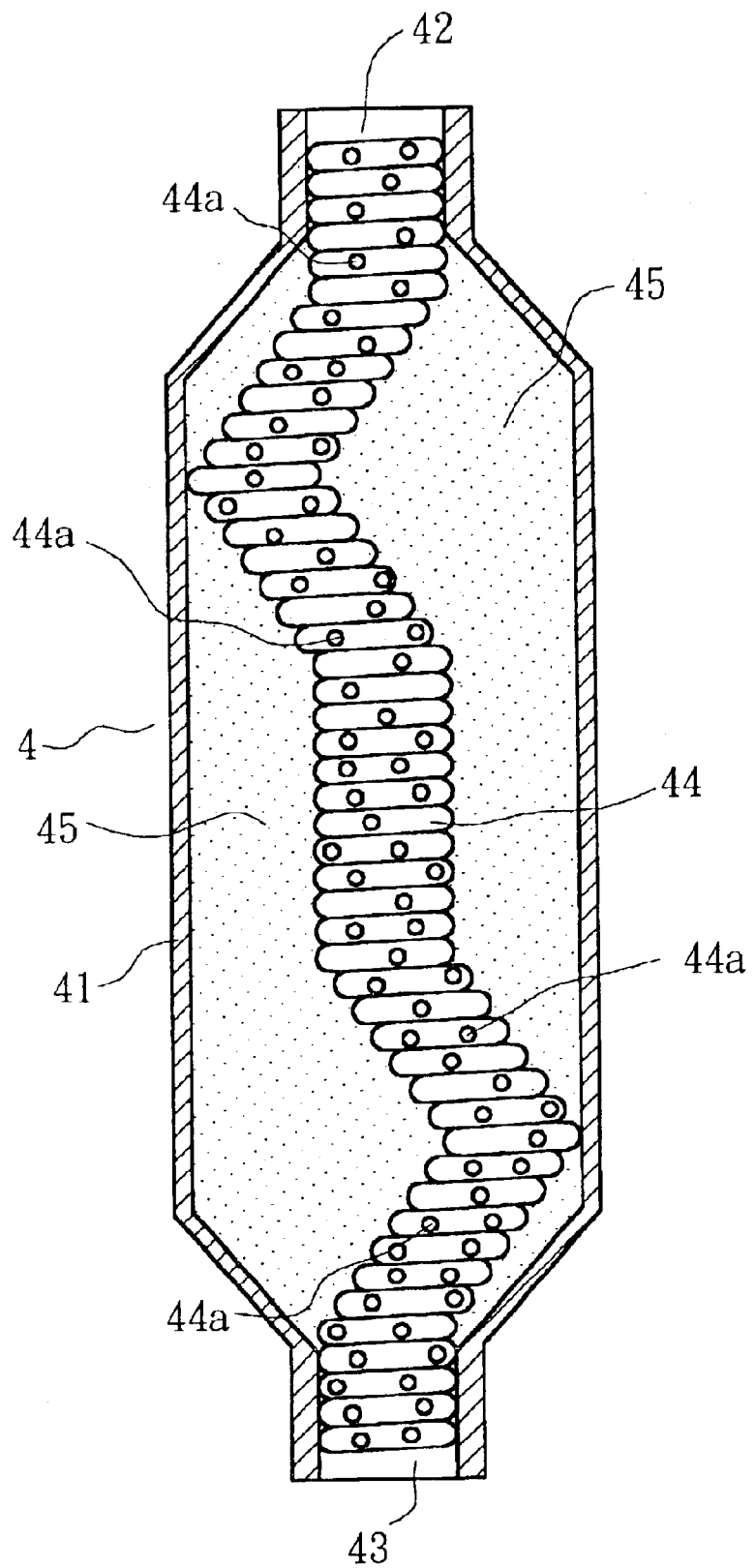
FIG. 4 is a cross sectional view of a fourth embodiment of a muffler assembly that is made by a manufacturing method in accordance with the present invention.

FIG. 4 shows a fourth embodiment of the muffler assembly (4) that is manufactured by the method of the present invention. The muffler assembly of the embodiment comprises a cylinder (41) that has a first end forged to form an inlet pipe (42) and a second end forged to form an exhaust pipe (43). A muffling device (44) is received in the cylinder (41) and muffling material (45) fills the space between the muffling device (44) and an inner periphery of the cylinder (41). The muffling device (44) is spirally made of pipe material and has a length longer than that of the cylinder (41), such that the muffling device (44) forms multiple curves after being mounted in the cylinder (41). The muffling device (44) has multiple through holes (44a) formed therein such that sound waves are partially eliminated via the through holes (44a) and the muffling material (45) when the sound wave passes through the muffling device (44).

Figure 5:
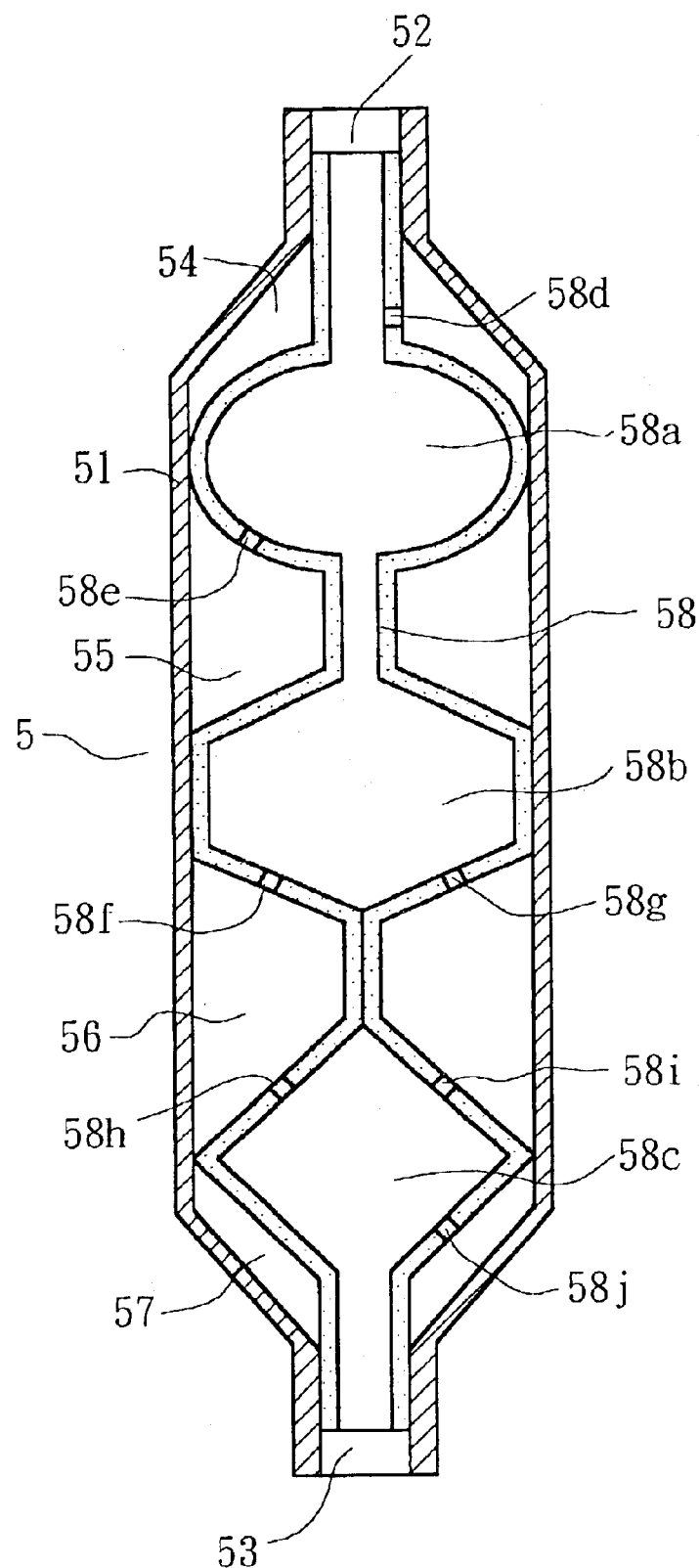
FIG. 5 is a cross sectional view of a fifth embodiment of a muffler assembly that is made by a manufacturing method in accordance with the present invention.
Figure 6A:
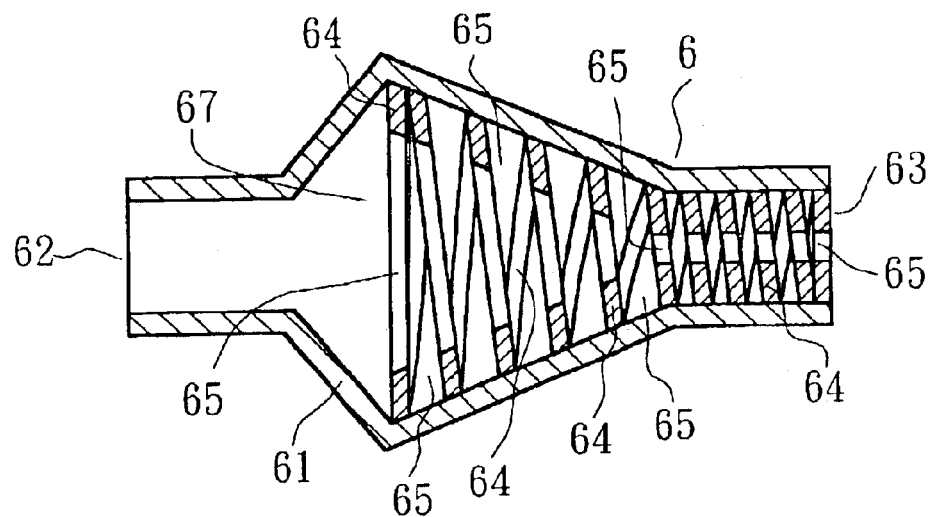
FIG. 6A is a cross sectional view of a sixth embodiment of a muffler assembly that is made by a manufacturing method in accordance with the present invention.
Figure 6B:
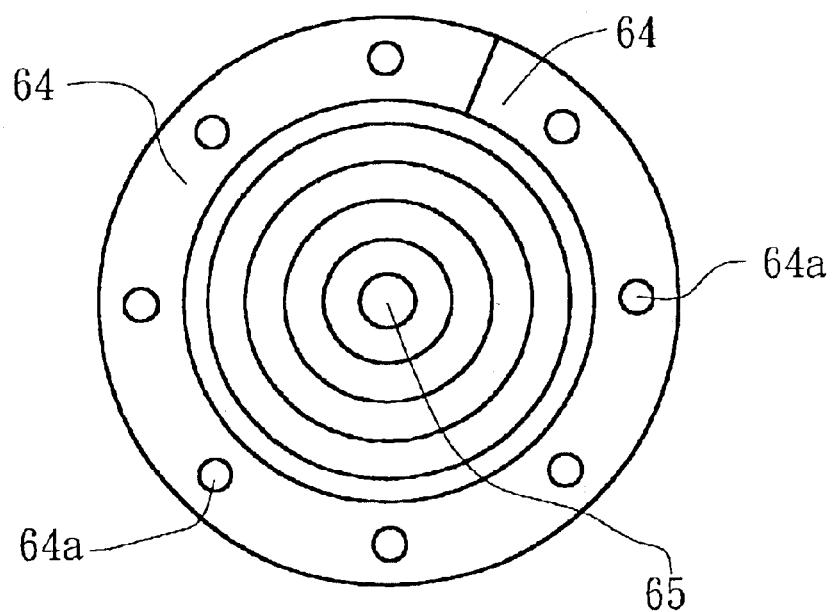
FIG. 6B is a side plan view of a muffling device in FIG. 6A.
Figure 6C:
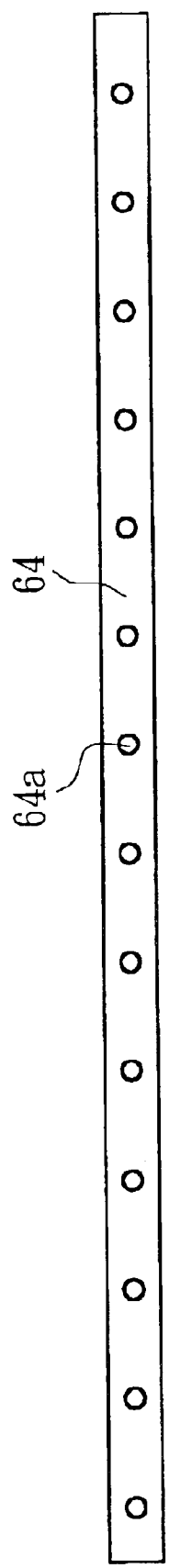
FIG. 6C is a plan view of the muffling device in FIG. 6A prior to being spirally formed.
Figure 6D:
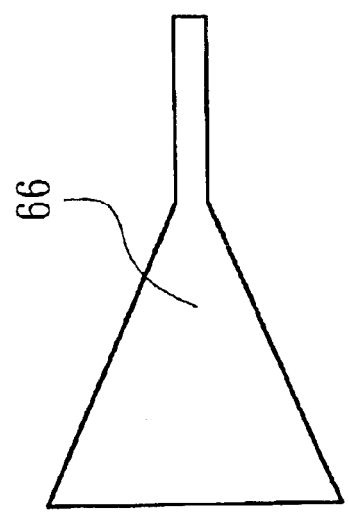
FIG. 6D is a funnel-shaped mold for forming the muffling device in FIG. 6A.
Figure 7A:
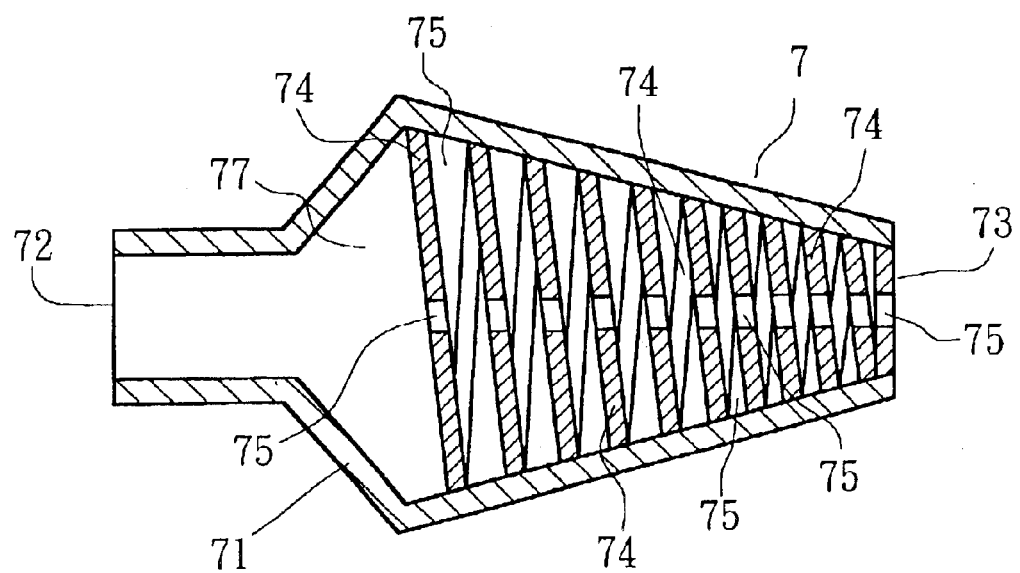
FIG. 7A is a cross sectional view of a seventh embodiment of a muffler assembly that is made by a manufacturing method in accordance with the present invention.
Figure 7B:
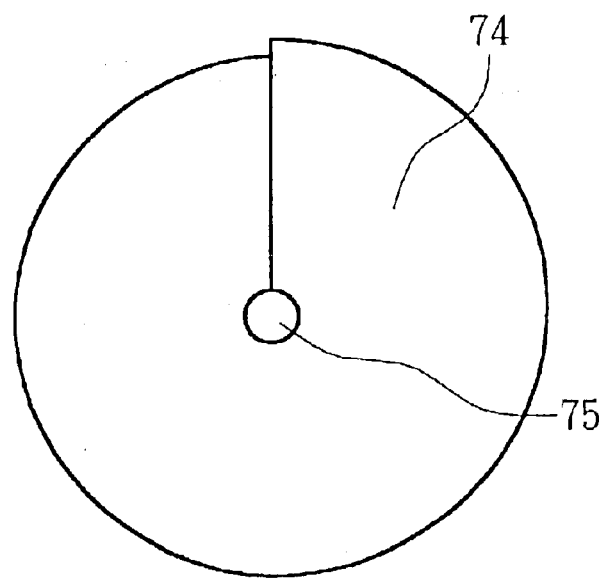
FIG. 7B is a side plan view of a muffling device in FIG. 7A.
Figure 7C:
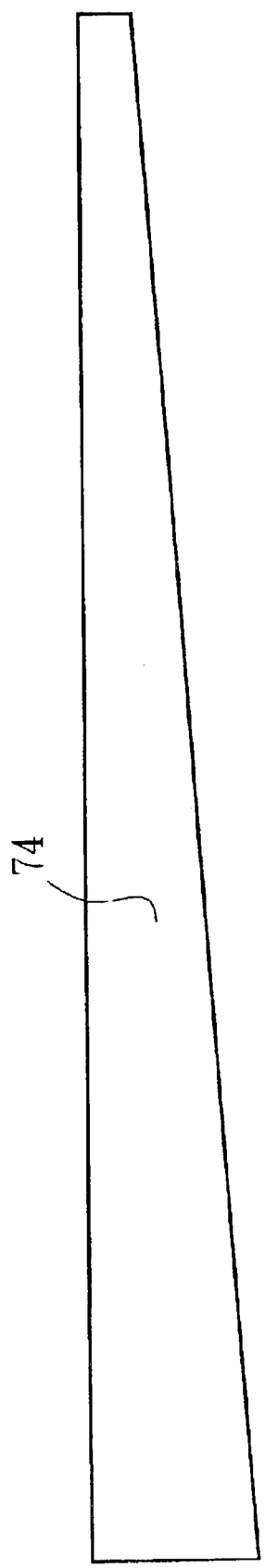
FIG. 7C is a plan view of the muffling device in FIG. 6A prior to being spirally formed.
Figure 7D:
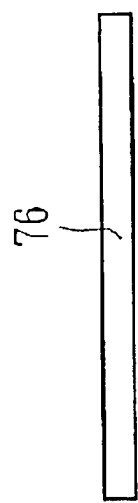
FIG. 7D is a stick-shaped mold for forming the muffling device in FIG. 7A.

With reference to FIG. 5, a fifth embodiment of the muffler assembly that is manufactured by the method of the present invention is shown. The muffler assembly (5) of the embodiment comprises a cylinder (51) having a first end forged to form an inlet pipe (52) and a second end forged to form an exhaust pipe (53). The cylinder (51) has a first resonance chamber (54), a second resonance chamber (55), a swell chamber (56) and a third resonance chamber (57). A muffling device (58) is longitudinally received in the cylinder (51) and has two opposite ends respectively secured in the inlet pipe (52) and the exhaust pipe (53) of the cylinder (51). The muffling device (58) has a first swell chamber (58a) separating the first resonance chamber (54) from the second resonance chamber (55), a second swell chamber (58b) separating the second resonance chamber (55) from the swell chamber (56) and a third swell chamber (58c) separating the swell chamber (56) from the third resonance chamber (57). The first swell chamber (58a) communicates with the inlet pipe (52) and the third swell chamber (58c) communicates with the exhaust pipe (53). The first swell chamber (58a) has a first through hole (58d) formed therein to communicate between the first swell chamber (58a) and the first resonance chamber (54), and a second through hole (58e) formed therein to communicate between the first swell chamber (58a) and the second resonance chamber (55). The second swell chamber (58b) has two through holes (58f, 58g) formed therein to communicate between the second swell chamber (58b) and the swell chamber (56) of the cylinder (51). The third swell chamber (58c) has two first through holes (58h, 58i) formed therein to communicate between the third swell chamber (58c) and the swell chamber (56) of the cylinder (51), and a second through hole (58j) formed therein to communicate between the third swell chamber (58c) and the third resonance chamber (57).

Sound waves resonate and are partially eliminated in the first resonance chamber (54) after passing through the inlet pipe (52) and the first through hole (58d). The sound waves expand and are partially eliminated in the first swell chamber (58a) in the cylinder (51). The sound waves resonate and are partially eliminated in the second resonance chamber (55) after passing the second through hole (58e). The sound waves expand and are partially eliminated in the second swell chamber (58b). The sound waves expand and are partially eliminated in the swell chamber (56) after passing through the two through holes (58f, 58g) in the second swell chamber (58b). The sound waves are compressed and partially eliminated when passing the two first through hole (58h, 58i). The sound waves expand and are partially eliminated in the third swell chamber (58c) after passing through the two first through holes (58h, 58i). The sound waves resonate and are partially eliminated in the third resonance chamber (57) after passing through the second through hole (58j) in the third swell chamber (58c). Finally, the residual sound waves are is exhausted via the exhaust pipe (53).

FIGS. 6A–6D show a sixth embodiment of the muffler assembly that is manufactured by the method of the present invention. The muffler assembly (6) of the embodiment comprises a cylinder (61) having a first end forged to from an inlet pipe (62), a second end forged to formed an exhaust pipe (63) and a swell chamber (67) defined in the cylinder (61) between the two opposite ends of the cylinder (61). A muffling device (64) is longitudinally received in the swell chamber (67) and the exhaust pipe (63). The muffling device (64) is made of a metal strap that is spirally wound along an outer periphery of a funnel-shaped mold (66) to form a passage (65) in the muffling device (64). A series of through holes (64a) are formed in the muffling device (64). Consequently, sound waves expand and are partially eliminated in the swell chamber (67) and gradually compressed to be partially eliminated when passing through the through holes (64a) of the muffling device (64). Finally, the residual sound waves are exhausted via the exhaust pipe (63) of the cylinder (61).

FIGS. 7A–7D show a seventh embodiment of the muffling assembly that is manufactured by the method of the present invention. The muffler assembly (7) of the embodiment comprises a cylinder (71) having a first end forged to form an inlet pipe (72), a second end forged to form an exhaust pipe (73) and a swell chamber (77) defined in the cylinder (71) between the two opposite ends of the cylinder (71). A muffling device (74) is longitudinally received in the swell chamber (77) and the exhaust pipe (73). The muffling device (74) is made of a tapered plate that is spirally wound along an outer periphery of a stick-shaped mold (76) to form a passage (75) in the muffling device (74). Consequently, sound waves expand and are partially eliminated in the swell chamber (77) and are gradually compressed to be partially eliminated when passing through the passage (75) of the muffling device (74). Finally, the residual sound waves are exhausted via the exhaust pipe (73) of the cylinder (71).

Figure 8:
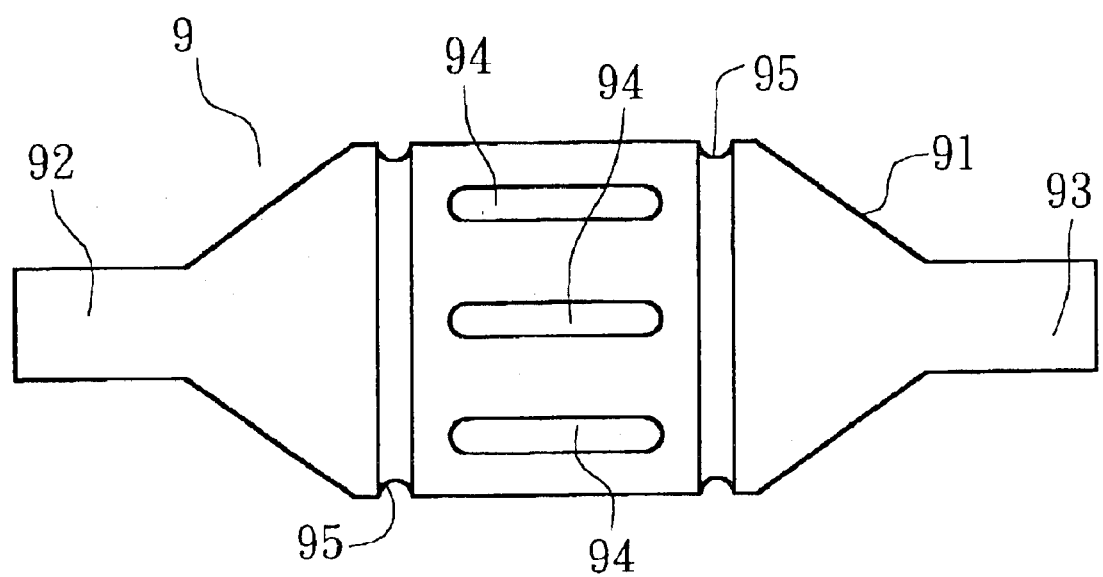
FIG. 8 is a plan view of another embodiment of the cylinder that is manufactured in accordance with the present invention.

With reference to FIG. 8, another embodiment of the cylinder is shown. The cylinder (91) of the embodiment comprises a first end forged to form an inlet pipe (92) and a second end forged to form an exhaust pipe (93). The cylinder (91) has multiple annular grooves (95) and multiple longitudinal grooves (94) defined in an outer periphery of the cylinder (91). The annular grooves (95) and the longitudinal grooves (94) can strengthen the structure of the cylinder (91) and provide reflective surfaces in the muffler assembly to promote the muffling effect of the present invention.

Although the invention has been explained in relation to its preferred embodiment, it is to be understood that many other possible modifications and variations can be made without departing from the spirit and scope of the invention as hereinafter claimed.

What is claimed is:

1. A manufacturing method of a muffler assembly comprising the steps of:

cutting a cylinder to have a length slightly longer than that of a muffling device;

forging a first end of the cylinder to form an exhaust pipe;

spirally winding a muffling device and inserting the muffling device into the cylinder via a second end of the cylinder and received in a middle portion of the cylinder;

forging the second end of the cylinder to form an inlet pipe; and the muffling device being respectively received in the inlet pipe and the exhaust pipe, and forging the inlet pipe and the exhaust pipe again to hold the muffling device in place in the middle portion of the cylinder.

2. The manufacturing method as claimed in claim 1, wherein the muffling device comprises multiple spirals separated from one another, a first end secured in the inlet pipe, a second end secured in the exhaust pipe, and muffling material being fully filled in the cylinder.

3. The manufacturing method as claimed in claim 2, wherein the muffling device has a length longer than that of the cylinder such that muffling device has multiple curved formed after being mounted in the cylinder.

4. The manufacturing method as claimed in claim 2, wherein the cylinder has multiple annular grooves and multiple longitudinal grooves defined in an outer periphery of the cylinder to strengthen the structure of the cylinder and provide reflective surfaces within the muffler assembly to promote a muffling effect.

5. The manufacturing method as claimed in claim 1, wherein the muffling device has a length longer than that of the cylinder such that muffling device has multiple curves formed after being mounted in the cylinder.

6. The manufacturing method as claimed in claim 5, wherein the cylinder has multiple annular grooves and multiple longitudinal grooves defined in an outer periphery of the cylinder to strengthen the structure of the cylinder and provide reflective surfaces within the muffler assembly to promote a muffling effect.

7. The manufacturing method as claimed in claim 1, wherein the muffling device has a changeable diameter to form multiple swell chambers and resonance chambers.

8. The manufacturing method as claimed in claim 7, wherein the cylinder has multiple annular grooves and multiple longitudinal grooves defined in an outer periphery of the cylinder to strengthen the structure of the cylinder and provide reflective surfaces within the muffler assembly to promote a muffling effect.

9. The manufacturing method as claimed in claim 7, wherein the muffling device divides the cylinder into multiple swell chambers and resonance chambers.

10. The manufacturing method as claimed in claim 9, wherein the cylinder has multiple annular grooves and multiple longitudinal grooves defined in an outer periphery of the cylinder to strengthen the structure of the cylinder and provide reflective surfaces within the muffler assembly to promote a muffling effect.

11. The manufacturing method as claimed in claim 1, wherein the cylinder has multiple annular grooves and multiple longitudinal grooves defined in an outlet periphery of the cylinder to strengthen the structure of the cylinder and provide reflective surfaces within the muffler assembly to promote a muffling effect.

* * * * *